(12) United States Patent
Sadowski et al.

(10) Patent No.: US 7,034,837 B2
(45) Date of Patent: Apr. 25, 2006

(54) METHOD, SYSTEM, AND COMPUTER PROGRAM PRODUCT FOR DETERMINING A STRUCTURE OF A GRAPHICS COMPOSITOR TREE

(75) Inventors: Greg Sadowski, Cambridge, MA (US); Eric Kunze, Sunnyvale, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 137 days.

(21) Appl. No.: 10/429,328

(22) Filed: May 5, 2003

(65) Prior Publication Data

US 2004/0222994 A1    Nov. 11, 2004

(51) Int. Cl.
*G06T 1/20*    (2006.01)
(52) U.S. Cl. ...................................... 345/506
(58) Field of Classification Search ................ 345/629, 345/634, 503, 505, 506; 709/201, 220, 222; 713/153, 168; 370/254, 255, 256, 257
See application file for complete search history.

(56) References Cited

U.S. PATENT DOCUMENTS

| | | | |
|---|---|---|---|
| 4,780,709 A | 10/1988 | Randall | |
| 5,146,335 A | 9/1992 | Kim et al. | |
| 5,712,995 A | 1/1998 | Cohn | |
| 5,736,988 A | 4/1998 | Shaw et al. | |
| 5,815,168 A | 9/1998 | May | |
| 5,878,232 A * | 3/1999 | Marimuthu | 709/249 |
| 6,008,803 A | 12/1999 | Rowe et al. | |
| 6,157,972 A * | 12/2000 | Newman et al. | 710/100 |
| 6,191,800 B1 | 2/2001 | Arenburg et al. | |
| 6,223,183 B1 | 4/2001 | Smith et al. | |
| 6,229,544 B1 | 5/2001 | Cragun | |
| 6,259,826 B1 | 7/2001 | Pollard et al. | |
| 6,344,852 B1 | 2/2002 | Zhu et al. | |
| 6,396,325 B1 | 5/2002 | Goodell | |
| 6,466,223 B1 | 10/2002 | Dorbie et al. | |

(Continued)

OTHER PUBLICATIONS

S. Molnar, J. Eyles, J. Poulton. PixelFlow : High-Speed Rendering Using Image Composition. In Proceedings of the 19th Annu Conference on Computer Graphics and Interactive Techniques. ACM SIGGRAPH Computer Graphics. Jul. 1992. pp231-240.*

(Continued)

*Primary Examiner*—Kee M. Tung
(74) *Attorney, Agent, or Firm*—Sterne, Kessler, Goldstein & Fox P.L.L.C.

(57) ABSTRACT

Compositors are identified in a manner that defines the position of the compositor in the compositor tree. Each compositor has its own "unique compositor identifier". Starting at the most downstream compositor, it transmits its unique compositor identifier to all upstream compositors directly coupled to it. The upstream compositors receive the unique compositor identifier from the most downstream compositor. Each of the upstream compositors appends its unique compositor identifier to the unique compositor identifier received from the most downstream compositor to produce a "compositor tree compositor identifier". The compositor tree compositor identifier identifies both the compositor and its position in the compositor tree. This enables an application to detect the structure of the compositor tree so that the application can determine a desired tiling configuration that exploits the structure of the compositor tree.

17 Claims, 10 Drawing Sheets

U.S. PATENT DOCUMENTS

| | | | |
|---|---|---|---|
| 6,470,287 B1 | 10/2002 | Smartt | |
| 6,483,515 B1 | 11/2002 | Hanko | |
| 6,496,484 B1 * | 12/2002 | Suzuki | 370/254 |
| 6,515,673 B1 | 2/2003 | Hashimoto et al. | |
| 6,525,737 B1 | 2/2003 | Duluk, Jr. et al. | |
| 6,552,723 B1 | 4/2003 | Duluk, Jr. et al. | |
| 6,556,543 B1 * | 4/2003 | Park et al. | 370/255 |
| 6,574,663 B1 * | 6/2003 | Bakshi et al. | 709/220 |
| 6,624,797 B1 | 9/2003 | Wheeler et al. | |
| 6,643,773 B1 * | 11/2003 | Hardjono | 713/153 |
| 6,714,196 B1 | 3/2004 | McCormack et al. | |
| 6,724,403 B1 | 4/2004 | Santoro | |
| 6,724,946 B1 | 4/2004 | Kusama et al. | |
| 6,753,878 B1 * | 6/2004 | Heirich et al. | 345/629 |
| 6,754,184 B1 * | 6/2004 | Kato et al. | 370/257 |
| 2003/0147354 A1 * | 8/2003 | Gebhardt et al. | 370/254 |
| 2003/0158886 A1 * | 8/2003 | Walls et al. | 709/201 |
| 2003/0160792 A1 * | 8/2003 | Alcorn | 345/502 |
| 2003/0164832 A1 * | 9/2003 | Alcorn | 345/505 |
| 2003/0223377 A1 * | 12/2003 | Simmons et al. | 370/254 |
| 2004/0123014 A1 * | 6/2004 | Schaefer et al. | 710/313 |
| 2005/0086399 A1 * | 4/2005 | Mahany et al. | 710/18 |

OTHER PUBLICATIONS

Gordon Stoll et al. Lighning-2: A High-Performance Display Subsystem for PC Cluster. In Proceedings of the 28th Annual Conference on Computer Graphics and Interactive Techniques. Aug. 2001. pp. 141-148.*

Sathoshi Nishimura and Tosiyasu Kunii. VC-1: A Scalable Graphics Computer with Virtual Local Frame Buffers. In Proceedings of the 23rd Annual Conference on Computer Graphics and Interactive Techniques. Aug. 1996. pp. 365-373.*

Matthew Eldridge, Homan Igehy, and Pat Hanrahan. Pomegranate: A Fully Scalable Graphics Architecture. In Proceedings of the 27th Annual Conference on Computer Graphics and Interactive Techniques. Jul. 2000. pp. 443-454.*

Bin Wei, Douglas Clark, Edward Felten, and Kai Li. Performance Issues of a Distributed Frame Buffer on a Multicomputer. In Proceedings of the ACM SIGGraph/ EuroGraphics workshop on Graphics Hardware. Aug. 1998. pp. 87-96.*

* cited by examiner

METHOD, SYSTEM, AND COMPUTER PROGRAM PRODUCT FOR DETERMINING A STRUCTURE OF A GRAPHICS COMPOSITOR TREE

BACKGROUND OF THE INVENTION

1. Field of the Invention

The present invention relates to computer graphics technology.

2. Related Art

Among the many functions that can be performed on personal and workstation computers, the rendering of images has become one of the most highly valued applications. The ever advancing demand for increasingly sophisticated image rendering capabilities has pulled the development of both hardware and software technologies towards meeting this end. Indeed, computer graphics applications have facilitated the introduction of multiprocessors into the designs of personal and workstation computers. Today, many personal and workstation computers include, in addition to a central processing unit, one or more "graphics controllers" dedicated to processing graphics data and rendering images.

To increase rendering speed, computer graphics processes have been decomposed into standard functions performed in sequential stages of a "graphics pipeline". At least one "graphics processing unit" ("GPU") operates on each stage. As each stage completes its specific function, the results are passed along to the next stage in the graphics pipeline. Meanwhile, the output of a prior stage (relating to the next frame in the sequence) is received. In this manner, the rendering speed of the overall process is increased to equal the processing speed of the slowest stage. Stages can be implemented using hardware, software, or a combination thereof.

Generally speaking, a computer graphics pipeline typically includes, in sequential order, a geometry stage and a rasterizer stage. An application passes graphics data to a computer graphics pipeline. For example, an application may determine the image to be rendered and model the three-dimensional curvilinear form of each object in the image as a three-dimensional assembly of interconnected two-dimensional polygons (called "primitives") that approximates the shape of the object. Each polygon is defined by a set of coordinates and an outwardly pointing vector normal to the plane of the polygon.

The geometry stage acts on the graphics data it receives from the application. The geometry stage often is further decomposed into more functional stages, each of which can have an associated processor to perform operations. For example, these stages can include, but are not limited to, a model and view transform stage, a light and shading stage, a projection stage, a clipping stage, a screen mapping stage, and others. The rasterizer stage uses the results of the geometry stage(s) to control the assignment of colors to pixels as the image is rendered.

As computer graphics has matured as a technology, standards have been created to coordinate paths of development, to ensure compatibility among systems, and to reduce the amount of investment capital necessary to further the state of the art. These standards allow designers a fair degree of leeway in choosing between hardware and software technologies to perform specific functions. For a given hardware architecture, much of the current efforts in developing computer graphics centers on means to optimize the processing power of the given architecture.

The use of multiple GPUs in computer graphics hardware not only enables stages in a graphics pipeline to be processed simultaneously, but also allows for additional graphics pipelines for parallel processing. With parallel processing, graphics pipelines can be assigned to different images. Using this architecture, the different images can be combined, by "compositing", to be presented for final viewing.

A "compositor" is a component that performs compositing and is often implemented in hardware. Within a compositor is a device capable of receiving input data and outputting all or part of the data as an image. The portion of the data presented for viewing is designated as the "display area".

Communications to a compositor can occur through a variety of means. To facilitate the use of high performance digital displays, a "Digital Visual Interface" ("DVI") standard has been developed to establish a protocol for communications between central processing units and peripheral graphics chips. DVI is an open industry standard designed to enable high performance digital displays while still supporting legacy analog technology. DVI uses both "Transitional Minimized Differential Signal" ("TMDS") data links and "Inter Integrated Circuit" ("I$^2$C") busses. TMDS data links use a technique that produces a transition controlled DC balanced series of characters from an input sequence of data bytes. Bits in a long string of 1s or 0s are selectively inverted in order to keep the DC voltage level of the signal centered around a threshold that determines whether the received data bit is a 1 voltage level or a 0 voltage level. I$^2$C busses provide two-wire communication links between integrated circuits.

Compositing can be accomplished through several different methods. Where frames are presented in a dynamic sequence, "temporal compositing" can be performed by using each graphics pipeline to process a succeeding frame. Alternatively, "spatial compositing" can be performed by using each graphics pipeline to render a portion of each overall frame and combining the output of each graphics pipeline spatially with respect to the location of the rendered portion within the overall frame. In temporal compositing, where the computer graphics hardware has "n" graphics pipelines, each graphics pipeline processes every $n^{th}$ frame in a sequence of frames. Each graphics pipeline renders all of the objects and the background in a single frame. Often the outputs of the graphics pipelines are multiplexed together further to increase the speed at which a sequence of frames is rendered.

However, for a given number of graphics pipelines, optimal temporal compositing depends on the relationship between the rendering speed of a given graphics pipeline and the rate at which image outputs can be combined. Adding features to an image to improve its quality can also increase the "complexity" of the data to be rendered and reduce the speed at which a frame is rendered by a graphics pipeline. This, in turn, can lower the rate at which image outputs are composited.

Another problem posed by a composition process in the time domain arises when the rendered images reside in an interactive environment. In an interactive environment, a user viewing a sequence of frames of images is permitted to supply a feedback signal to the system. This feedback signal can change the images that are rendered. In a time domain composition system, there can be a noticeable delay between the time at which the user provides the feedback signal and the time at which the system responds to it. The user supplies the feedback signal at a particular frame to one of the graphics pipelines in the system. Because the other graphics pipelines are already in the process of rendering their pre-feedback frames, the system typically imposes a time delay to allow the other graphics pipelines to complete their rendering of these frames before acting on the feedback signal.

In contrast, in spatial compositing, where the computer graphics hardware has n graphics pipelines, each graphics pipeline renders one of n subsets of the pixels of each frame. Each subset is combined, by compositing, to be presented for final viewing. By reducing the amount of graphics data that each graphics pipeline must act on, spatial compositing can increase the rate at which an overall frame is rendered.

In spatial compositing, a "compositing window" is located within all or a part of the display area. The compositing window is divided, or decomposed, into non-overlapping portions called "tiles". Each tile receives the output of an assigned graphics pipeline to effect spatial compositing. The shape and size of the compositing window and the shape, size, and position of each of the tiles can be defined by parameters that characterize the two-dimensional contours of the compositing window and tiles. Parameters can include, but are not limited to, coordinate points for corners, centers, or focal points; lengths of radii; interior angles; and degrees of curvature.

Whereas with temporal compositing, heavy loading of a graphics pipeline processor reduces the rate at which frames are rendered, with spatial compositing this rate is increased to that of the slowest graphics pipeline. Therefore, optimization depends on the ability of the system to balance the processing load among the different graphics pipelines. The processing load typically is a direct function of the size of a given tile and an inverse function of the rendering complexity for objects within this tile. Thus, often an application will vary the sizes of the different tiles within the compositing window in order to balance the processing load among the graphics pipelines for the rendering of a given frame.

However, the cost of this flexibility is that it can be necessary to communicate the number, sizes, and positions of tiles being used for that given frame. This can add substantially to the overhead information that must be communicated for spatially composited images. This situation compounds an already difficult problem as advancements in memory capacities and processor speeds have outstripped improvements in interconnect bus throughputs. To minimize the extent to which data links become bottlenecks, what is needed is an efficient technique to identify individual compositors within a compositor tree and to detect the structure of the compositor tree so that an application can determine a desired tiling configuration that exploits the structure of the compositor tree.

SUMMARY OF THE INVENTION

The present invention relates to computer graphics technology. More specifically, the present invention provides a method, system, and computer program product for determining a structure of a graphics compositor tree.

Compositors can be configured in cascading stages where the output of one or more compositors provide inputs for another compositor. Such an arrangement is known as a "compositor tree". At a first stage, a compositor receives the output of one or more graphics pipelines. In subsequent stages, a compositor receives the output of one or more compositors from a previous stage.

Compositors in a compositor tree communicate with each other and to graphics controllers through data links, such as those that meet the Digital Visual Interface (DVI) standard.

To minimize the extent to which these data links become bottlenecks, the present invention provides an efficient technique to identify individual compositors within a compositor tree and to detect the structure of the compositor tree so that an application can determine a desired tiling configuration that exploits the structure of the compositor tree.

Compositors are identified in a manner that defines the position of the compositor in the compositor tree. Each compositor has its own "unique compositor identifier". The unique compositor identifier can be assigned to the compositor during an initialization process, can be a machine readable serial number, or can be provided in some other manner. The unique compositor identifier forms the basis upon which compositors in the compositor tree can be identified in a manner that defines the position of the compositor in the compositor tree.

The most downstream compositor transmits its unique compositor identifier to upstream compositors directly coupled to the most downstream compositor. The upstream compositors receive the unique compositor identifier from the most downstream compositor. Each of the upstream compositors appends its unique compositor identifier to the unique compositor identifier received from the most downstream compositor to produce a "compositor tree compositor identifier". Thus, the compositor tree compositor identifier identifies both the compositor and its position in the compositor tree. Within a compositor tree identifier of an upstream compositor, the compositor tree compositor identifier that the upstream compositor received is referred to as its "parent compositor tree compositor identifier".

In turn, the upstream compositors transmit their compositor tree compositor identifiers to their respective next upstream compositors. The next upstream compositors receive these as parent compositor tree compositor identifiers. Each of the next upstream compositors appends its unique compositor identifier to the parent compositor tree compositor identifier that it received to produce its own compositor tree compositor identifier. This process continues until the graphics pipelines that provide inputs to the first stage compositors are identified by compositor tree compositor identifiers.

Where a compositor tree has graphics pipelines and compositors that are identified by compositor tree compositor identifiers, the structure of the compositor tree can be determined. The compositor tree compositor identifiers are used to locate the most downstream compositor, to count the number of upstream compositors coupled directly to it, to distinguish these upstream compositors, and to continue this process until the graphics pipelines that provide inputs to the first stage compositors are counted with respect to the distinguished first stage compositors to which the graphics pipelines are coupled.

Further embodiments, features, and advantages of the present invention, as well as the structure and operation of the various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The preferred embodiments of the invention are described with reference to the figures where like reference numbers indicate identical or functionally similar elements. Also in the figures, the left most digit of each reference number identifies the figure in which the reference number is first used.

DETAILED DESCRIPTION OF THE PREFERRED EMBODIMENTS

Table of Contents
Overview
Method to Identify a Compositor in a Compositor Tree
Methods to Determine a Structure of a Compositor Tree
Systems to Identify a Compositor in and to Determine a Structure of a Compositor Tree
Computer Program Products to Identify a Compositor in and to Determine a Structure of a Compositor Tree

CONCLUSION

Overview

The present invention relates to computer graphics technology. More specifically, the present invention provides a method, system, and computer program product for determining a structure of a graphics compositor tree.

Compositors in a compositor tree communicate with each other and to graphics controllers through data links, such as those that meet the Digital Visual Interface (DVI) standard.

To minimize the extent to which these data links become bottlenecks, the present invention provides an efficient technique to identify individual compositors within a compositor tree and to detect the structure of the compositor tree so that an application can determine a desired tiling configuration that exploits the structure of the compositor tree.

Figure 1:
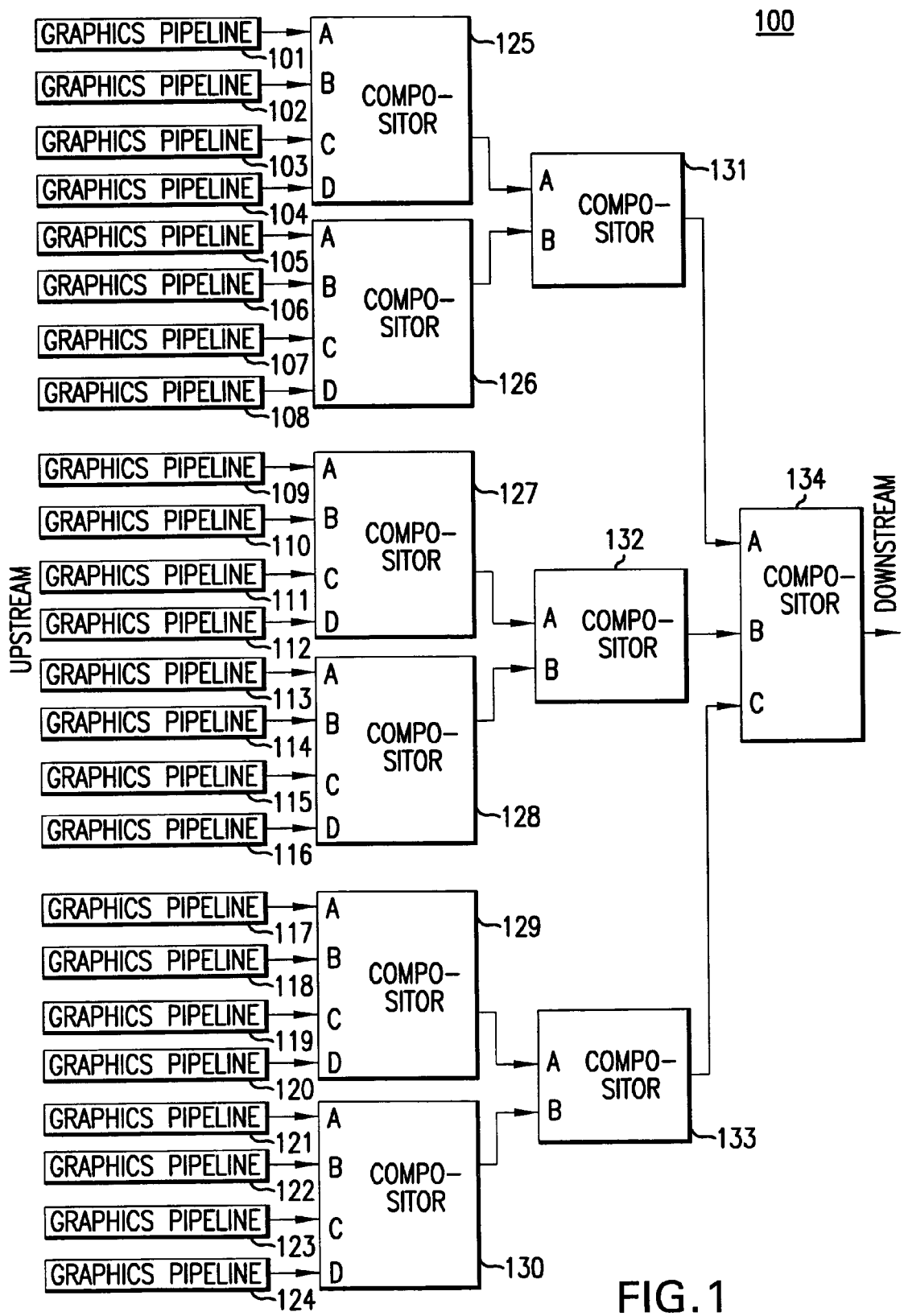
FIG. 1 illustrates a conventional compositor tree 100.

FIG. 1 illustrates a conventional compositor tree 100. Compositor tree 100 comprises graphics pipelines 101 through 124, a first stage of compositors 125 through 130, a second stage of compositors 131 through 133, and a final or third stage compositor 134. In the context of compositor tree 100, graphics pipelines 101 through 124 can be considered the most upstream compositors, while compositor 134 can be considered the most downstream compositor.

To demonstrate that compositors can be designed to have different numbers of inputs, compositors at each stage of compositor tree 100 have different numbers of inputs. The first stage compositors 125 through 130 each have four inputs, the second stage compositors 131 through 133 each have two inputs, and the third stage compositor 134 has three inputs. Consequently, each of the first stage compositors 125 through 130 receives inputs from four respective graphics pipelines, each of the second stage compositors 131 through 133 receives inputs from eight respective graphics pipelines, and the third stage compositor 134 receives inputs from all twenty-four graphics pipelines.

Compositors are identified in a manner that defines the position of the compositor in the compositor tree. Each compositor has its own "unique compositor identifier". The unique compositor identifier can be assigned to the compositor during an initialization process, can be a machine readable serial number, or can be provided in some other manner. The unique compositor identifier forms the basis upon which compositors in the compositor tree can be identified in a manner that defines the position of the compositor in the compositor tree.

Starting at the most downstream compositor, it transmits its unique compositor identifier to all upstream compositors directly coupled to it. For each port coupled to an upstream compositor, a "unique port identifier" can be attached to the unique compositor identifier. The upstream compositors receive the unique compositor identifier from the most downstream compositor. Each of the upstream compositors appends its unique compositor identifier to the unique compositor identifier received from the most downstream compositor to produce a "compositor tree compositor identifier". Thus, the compositor tree compositor identifier identifies both the compositor and its position in the compositor tree. If the unique port identifier is attached, the compositor tree compositor identifier also identifies which port of the most downstream compositor to which the upstream compositor is directly coupled. Within the compositor tree compositor identifier of an upstream compositor, the compositor tree compositor identifier that the upstream compositor received is referred to as its "parent compositor tree compositor identifier".

In turn, the upstream compositors transmit their compositor tree compositor identifiers to their respective next upstream compositors. For each port coupled to an upstream compositor, a unique port identifier can be attached to the appended compositor tree compositor identifier. The next upstream compositors receive these as parent compositor tree compositor identifiers. Each of the next upstream compositors appends its unique compositor identifier to the parent compositor tree compositor identifier that it received to produce its own compositor tree compositor identifier. For each port coupled to a next upstream compositor, a unique port identifier can be attached to the appended compositor tree compositor identifier. This process continues until the graphics pipelines that provide inputs to the first stage compositors are identified by compositor tree compositor identifiers.

Where a compositor tree has graphics pipelines and compositors that are identified by compositor tree compositor identifiers, the structure of the compositor tree can be determined. The compositor tree compositor identifiers are used to locate the most downstream compositor, to count the number of upstream compositors coupled directly to it, to distinguish these upstream compositors, and to continue this process until the graphics pipelines that provide inputs to the first stage compositors are counted with respect to the distinguished first stage compositors to which the graphics pipelines are coupled.

Method to Identify a Compositor in a Compositor Tree

Figure 2:
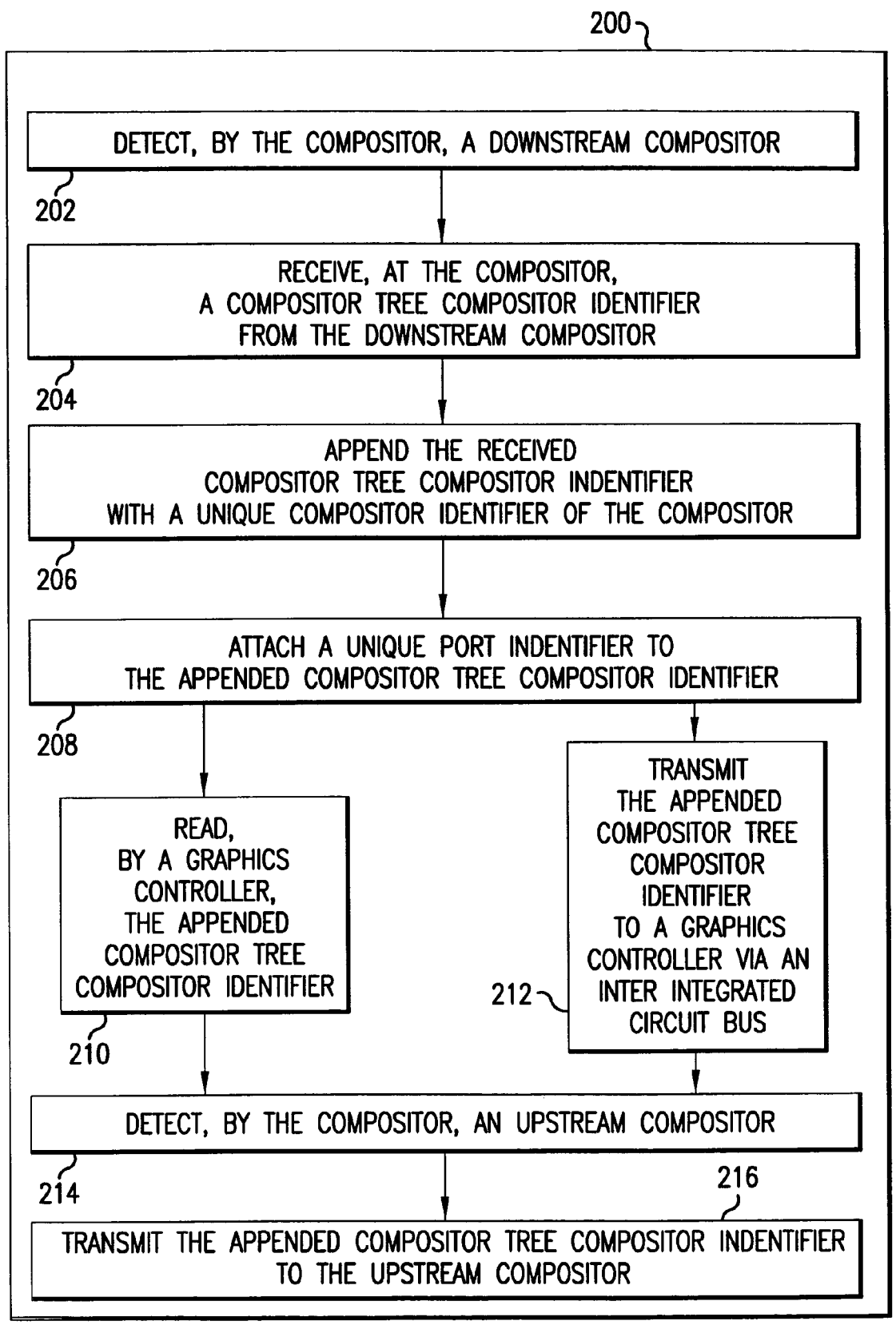
FIG. 2 is a block diagram of a method 200 of identifying a compositor in a compositor tree according to an embodiment of the present invention.

FIG. 2 is a block diagram of a method 200 of identifying a compositor in a compositor tree according to the present invention. Depending upon the capabilities of the compositors in the compositor tree, method 200 can start at a step 202. At step 202, a downstream compositor is detected by the compositor to be identified. For example, in compositor tree 100, compositor 131 can detect compositor 134. At a step 204, a compositor tree compositor identifier is received, at the compositor (e.g., compositor 131), from the downstream compositor (e.g., compositor 134). The received compositor tree compositor identifier can have attached a unique port identifier of a port of the downstream compositor to which the compositor is coupled.

Figure 3:
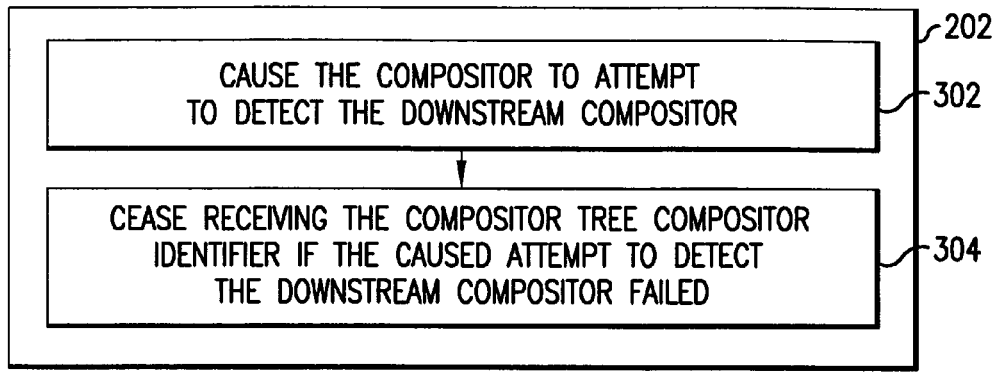
FIG. 3 is a block diagram of a method 202 to detect, by the compositor, a downstream compositor.

Detecting the downstream compositor can be accomplished through a variety of methods as would be known to the skilled artisan. However, the method of detection needs to account for the situation when the compositor seeking to receive the compositor tree compositor identifier is the most downstream compositor (e.g., compositor 134). FIG. 3 is a block diagram of a method 202 to detect, by the compositor, a downstream compositor. In method 202, at a step 302, the compositor is made to attempt to detect the downstream compositor. At a step 304, if the attempt to detect the downstream compositor failed, the compositor (e.g., compositor 134) ceases trying to receive the compositor tree compositor identifier from a downstream compositor.

Returning to method 200, at a step 206, the received compositor tree compositor identifier is appended with a unique compositor identifier of the compositor. The unique compositor identifier can be a machine readable serial number of a graphics pipeline or a compositor as shown in Table I:

TABLE I

| Graphics Pipeline/ Compositor | Serial Number |
| --- | --- |
| 101 | 01100101 |
| 102 | 01100110 |
| 103 | 01100111 |
| 104 | 01101000 |
| 105 | 01101001 |
| 106 | 01101010 |
| 107 | 01101011 |
| 108 | 01101100 |
| 109 | 01101101 |
| 110 | 01101110 |
| 111 | 01101111 |
| 112 | 01110000 |
| 113 | 01110001 |
| 114 | 01110010 |

TABLE I-continued

| Graphics Pipeline/ Compositor | Serial Number |
| --- | --- |
| 115 | 01110011 |
| 116 | 01110100 |
| 117 | 01110101 |
| 118 | 01110110 |
| 119 | 01110111 |
| 120 | 01111000 |
| 121 | 01111001 |
| 122 | 01111010 |
| 123 | 01111011 |
| 124 | 01111100 |
| 125 | 01111101 |
| 126 | 01111110 |
| 127 | 01111111 |
| 128 | 10000000 |
| 129 | 10000001 |
| 130 | 10000010 |
| 131 | 10000011 |
| 132 | 10000100 |
| 133 | 10000101 |
| 134 | 10000110 |

Alternatively, if the compositor does not have a machine readable serial number, the unique compositor identifier can be assigned to the compositor during an initialization process. For example, the initialization process can use the Universal Serial Bus and assign the bus node number of a graphics pipeline or a compositor as its unique compositor identifier as shown in Table II:

TABLE II

| Graphics Pipeline/ Compositor | Bus Node Number |
| --- | --- |
| 101 | 300 |
| 102 | 301 |
| 103 | 302 |
| 104 | 303 |
| 105 | 304 |
| 106 | 305 |
| 107 | 306 |
| 108 | 307 |
| 109 | 308 |
| 110 | 309 |
| 111 | 310 |
| 112 | 311 |
| 113 | 312 |
| 114 | 313 |
| 115 | 314 |
| 116 | 315 |
| 117 | 316 |
| 118 | 317 |
| 119 | 318 |
| 120 | 319 |
| 121 | 320 |
| 122 | 321 |
| 123 | 322 |
| 124 | 323 |
| 125 | 200 |
| 126 | 201 |
| 127 | 202 |
| 128 | 203 |
| 129 | 204 |
| 130 | 205 |
| 131 | 100 |
| 132 | 101 |
| 133 | 102 |
| 134 | 000 |

The skilled artisan will appreciate other means by which a unique compositor identifier can be assigned to the compositor such that the present invention is not limited to the methods described above.

Appending the received compositor tree compositor identifier can be accomplished through a variety of methods as would be known to the skilled artisan. For example, the unique compositor identifier can be directly appended to the received compositor tree compositor identifier.

Figure 4:
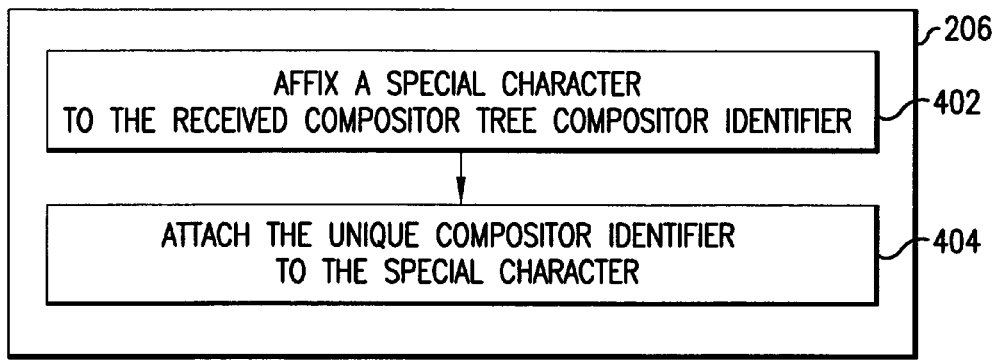
FIG. 4 is a block diagram of a method 206 to append the received compositor tree compositor identifier with a unique compositor identifier of the compositor.

Alternatively, FIG. 4 is a block diagram of a method 206 to append the received compositor tree compositor identifier with a unique compositor identifier of the compositor. In method 206, at a step 402, a special character (e.g., a period) is affixed to the received compositor tree compositor identifier. At a step 404, the unique compositor identifier is attached to the special character. The skilled artisan will appreciate other means by which to append the received compositor tree compositor identifier with a unique compositor identifier of the compositor such that the present invention is not limited to the methods described above.

Including a special character between the received compositor tree compositor identifier and the unique compositor identifier allows a parent compositor tree compositor identifier to be more clearly distinguished from the unique compositor identifier. For example, where a machine readable serial number of a graphics pipeline or a compositor is used as a unique compositor identifier and a period is used as a special character, compositor 126 receives from compositor 131 the following compositor tree compositor identifier:

10000110.10000011

This is the parent compositor tree compositor identifier for compositor 126. To this, a period is affixed. To the attached period, the unique compositor identifier of compositor 126 is attached. Thus, the compositor tree compositor identifier of compositor 126 is:

10000110.10000011.01111110

Returning to method 200, at a step 208, a unique port identifier can be attached to the appended compositor tree compositor identifier. If the unique port identifier is attached, the compositor tree compositor identifier also identifies which port of the compositor to which an upstream compositor is directly coupled. For example, where a bus node number of a graphics pipeline or a compositor is used as a unique compositor identifier, compositor 126 provides the following compositor tree compositor identifiers:

000A.100B.201A for graphics pipeline 105,
000A.100B.201B for graphics pipeline 106,
000A.100B.201C for graphics pipeline 107, and
000A.100B.201D for graphics pipeline 108.

Typically the compositor tree compositor identifier is communicated to the graphics controller. If the graphics controller is not capable of receiving Inter Integrated Circuit ($I^2C$) slave transmissions, then, at a step 210, the graphics controller reads the appended compositor tree compositor identifier. Alternatively, if the graphics controller is capable of receiving $I^2C$ slave transmissions, then, at a step 212, the appended compositor tree compositor identifier is transmitted to the graphics controller via an $I^2C$ bus.

Depending upon the capabilities of the compositors in the compositor tree, method 200 can proceed to a step 214. At step 214, an upstream compositor is detected by the compositor. For example, in compositor tree 100, compositor 131 can detect compositors 125 and 126. At a step 216, the appended compositor tree compositor identifier is transmitted to the upstream compositor (e.g., compositor 126).

Figure 5:
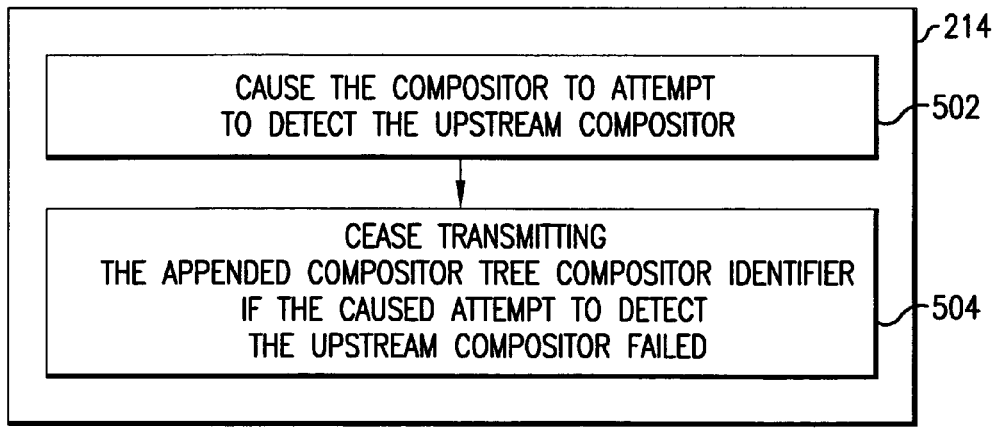
FIG. 5 is a block diagram of a method 212 to detect, by the compositor, an upstream compositor.

Detecting the upstream compositor can be accomplished through a variety of methods as would be known to the skilled artisan. However, the method of detection needs to account for the situation when the compositor seeking to transmit the appended compositor tree compositor identifier is a most upstream compositor (e.g., graphics pipeline 107). FIG. 5 is a block diagram of a method 212 to detect, by the compositor, an upstream compositor. In method 212, at a step 502, the compositor is made to attempt to detect the upstream compositor. At a step 504, if the attempt to detect the upstream compositor failed, the compositor (e.g., graphics pipeline 107) ceases trying to transmit the appended compositor tree compositor identifier to an upstream compositor.

Methods to Determine a Structure of a Compositor Tree

Figure 6:
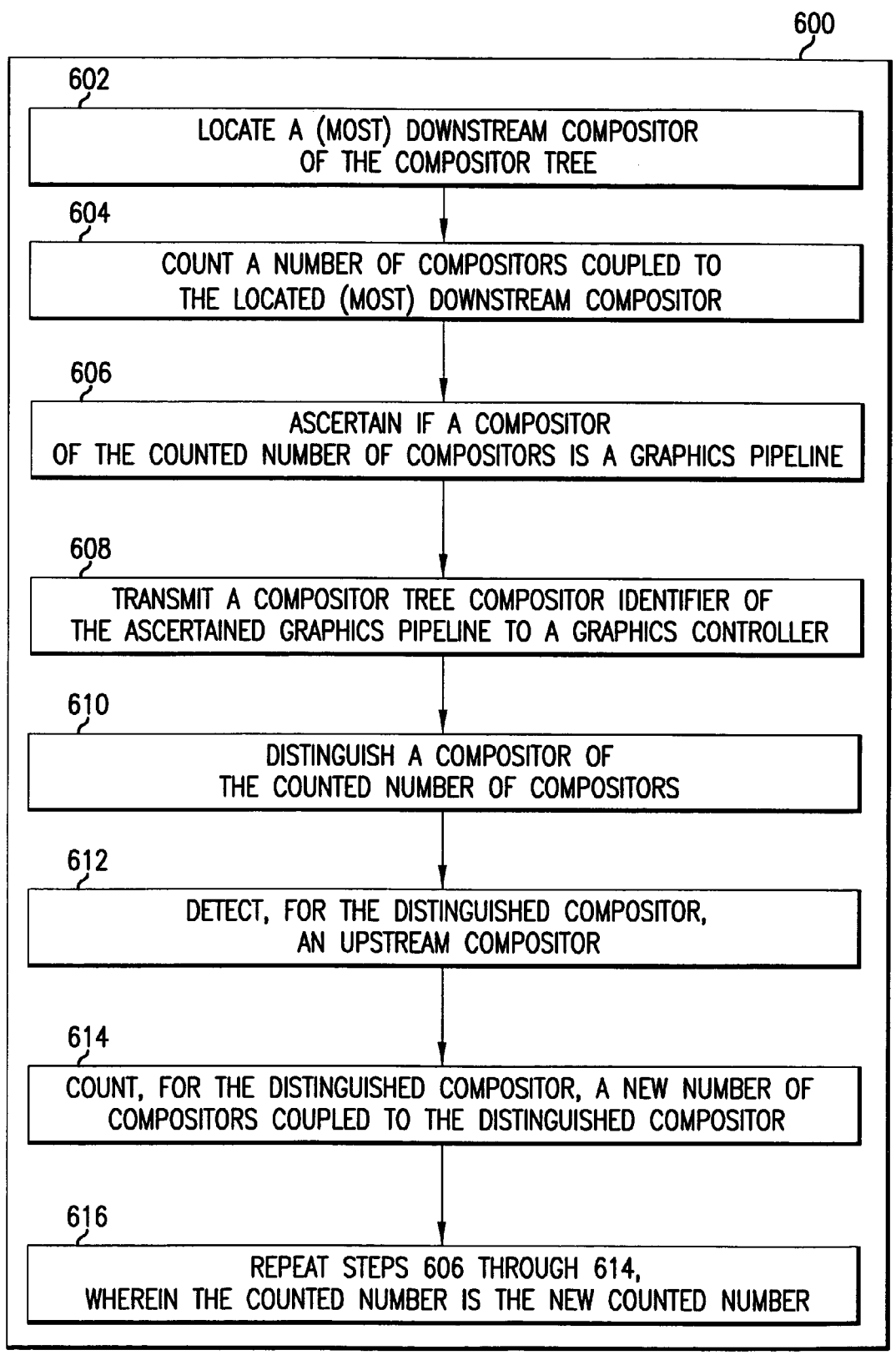
FIG. 6 is a block diagram of a method 600 of determining a structure of a compositor tree according to the present invention.

FIG. 6 is a block diagram of a method 600 of determining a structure of a compositor tree according to the present invention. In method 600, at a step 602, a downstream compositor of the compositor tree is located. Preferably, the downstream compositor is the most downstream compositor (e.g., compositor 134). Locating the most downstream compositor can be accomplished through a variety of methods as would be known to the skilled artisan. For example, a compositor of the compositor tree having a compositor tree compositor identifier with only one unique compositor identifier can be identified.

Figure 7:
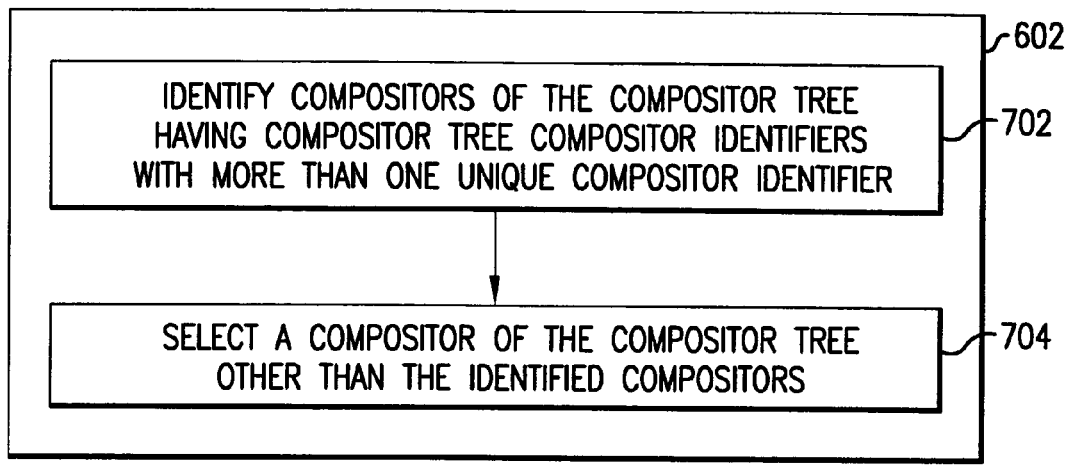
FIG. 7 is a block diagram of a method 602 of locating a most downstream compositor of the compositor tree.

Alternatively, FIG. 7 is a block diagram of a method 602 of locating a most downstream compositor of the compositor tree. In method 602, at a step 702, compositors of the compositor tree having compositor tree compositor identifiers with more than one unique compositor identifier are identified. Where compositor tree compositor identifiers use special characters as explained above, compositors of the compositor tree having compositor tree compositor identifiers with a special character are distinguished from the compositor having the compositor tree compositor identifier without a special character. At a step 704, a compositor of the compositor tree other than the identified compositors (e.g., compositor 134) is selected.

Figure 8:
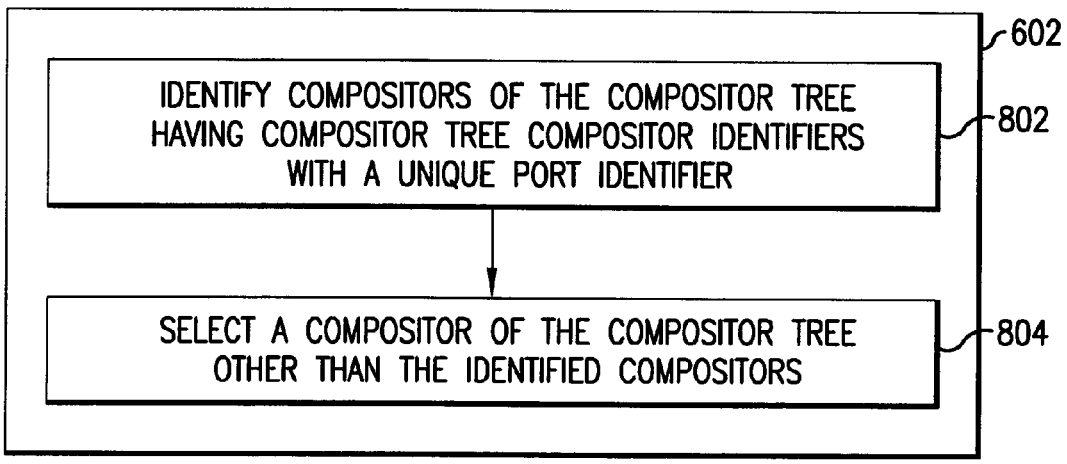
FIG. 8 is a block diagram of another method 602 of locating a most downstream compositor of the compositor tree.

Likewise, FIG. 8 is a block diagram of another method 602 of locating a most downstream compositor of the compositor tree. In other method 602, at a step 802, compositors of the compositor tree having compositor tree compositor identifiers with a unique port identifier are identified. At a step 804, a compositor of the compositor tree other than the identified compositors (e.g., compositor 134) is selected.

The skilled artisan will appreciate other means by which to locate the most downstream compositor such that the present invention is not limited to the methods described above.

Returning to method 600, at a step 604, a number of compositors coupled to the located downstream compositor is counted. For example, where compositor 134 is the most downstream compositor, three compositors can be coupled to compositor 134 (e.g., compositors 131 through 133).

Figure 9:
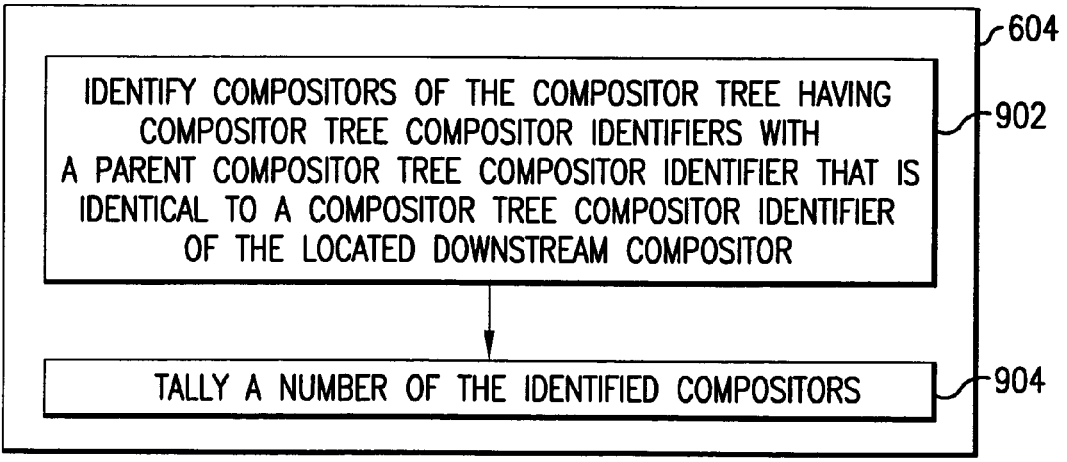
FIG. 9 is a block diagram of a method 604 of counting the number of compositors coupled to the located downstream compositor.

Counting the number of compositors coupled to the located downstream compositor can be accomplished through a variety of methods as would be known to the skilled artisan. For example, FIG. 9 is a block diagram of a method 604 of counting the number of compositors coupled to the located downstream compositor. In method 604, at a step 902, compositors of the compositor tree having compositor tree compositor identifiers with a parent compositor tree compositor identifier that is identical to a compositor tree compositor identifier of the located downstream compositor are identified. At a step 904, a number of the identified compositors are tallied.

Returning to method 600, at a step 606, it is ascertained if a compositor of the counted number of compositors is a graphics pipeline. Ascertaining if a compositor of the counted number of compositors is a graphics pipeline can be accomplished through a variety of methods as would be known to the skilled artisan. For example, it can be determined if a compositor tree compositor identifier of the compositor has an equal or greater number of unique compositor identifiers as compositor tree compositor identifiers of other compositors. Alternatively, it can be determined if a compositor tree compositor identifier of the compositor has an equal or greater number of special characters as compositor tree compositor identifiers of other compositors. Likewise, it can be determined if a compositor tree compositor identifier of the compositor has an equal or greater number of unique port identifiers as compositor tree compositor identifiers of other compositors.

At a step 608, a compositor tree compositor identifier of the ascertained graphics pipeline is transmitted to a graphics controller.

In the case of a two-stage compositor tree (i.e., graphics pipelines providing inputs to a single compositor), steps 602 through 608 are sufficient to determine the structure of the compositor tree. However, where the compositor tree has more than two stages (e.g., compositor tree 100), method 600 proceeds to a step 610. At step 610, a compositor of the counted number of compositors is distinguished. For example, where at step 604, compositors 131 through 133 were counted, at step 610, compositors 131, 132, and 133 can be distinguished.

Distinguishing a compositor of the counted number of compositors can be accomplished through a variety of methods as would be known to the skilled artisan. For example, a compositor tree compositor identifier of the distinguished compositor can be identified. Preferably, the compositor tree compositor identifier includes a parent compositor tree compositor identifier and a unique compositor identifier. Preferably, the parent compositor tree compositor identifier is a compositor tree compositor identifier of the located downstream compositor. For example, where a bus node number of a graphics pipeline or a compositor is used as a unique compositor identifier, compositor 126 can be identified as 000.100, compositor 132 can be identified as 000.101, and compositor 133 can be identified as 000.110.

Alternatively, a port on the located downstream compositor to which the distinguished compositor is coupled is identified. Preferably, a unique port identifier of the located downstream compositor is found within a compositor tree compositor identifier of the distinguished compositor. For example, where a unique port identifier is attached to a compositor tree compositor identifier, compositor 126 can be identified as 000A, compositor 132 can be identified as 000B, and compositor 133 can be identified as 000C.

Depending upon the capabilities of the compositors in the compositor tree, method 600 can proceed to a step 612. At step 612, an upstream compositor is detected by the distinguished compositor. For example, in compositor tree 100, compositor 131 can detect compositors 125 and 126. At a step 614, for the distinguished compositor, a new number of compositors coupled to the distinguished compositor are counted. For example, for each of compositors 131 through 133, two compositors are counted that can be coupled to a distinguished compositor. Compositors 125 and 126 can be coupled to compositor 131. Compositors 127 and 128 can be coupled to compositor 132. Compositors 129 and 130 can be coupled to compositor 133.

Figure 10:
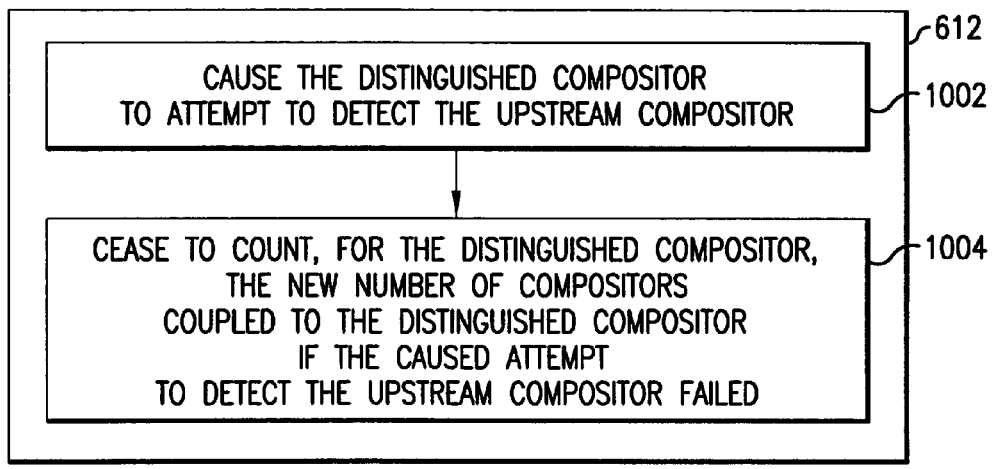
FIG. 10 is a block diagram of a method 612 to detect, by the distinguished compositor, an upstream compositor.

Detecting the upstream compositor can be accomplished through a variety of methods as would be known to the skilled artisan. However, the method of detection needs to account for the situation when the compositor seeking to transmit the appended compositor tree compositor identifier is a most upstream compositor (e.g., graphics pipeline 107). FIG. 10 is a block diagram of a method 612 to detect, by the distinguished compositor, an upstream compositor. In method 612, at a step 1002, the distinguished compositor is made to attempt to detect the upstream compositor. At a step 1004, if the attempt to detect the upstream compositor failed, the compositor (e.g., graphics pipeline 107) ceases trying to count, for the distinguished compositor, the new number of compositors coupled to the distinguished compositor.

In the case of a three-stage compositor tree (i.e., graphics pipelines providing inputs to a first stage of compositors, which provide inputs to a second stage compositor), steps 602 through 614 are sufficient to determine the structure of the compositor tree. However, where the compositor tree has more than three stages (e.g., compositor tree 100), method 600 proceeds to a step 616. At step 616, steps 606 through 614 are repeated, wherein the counted number of step 606 is replaced by the new counted number of step 614.

Figure 11:
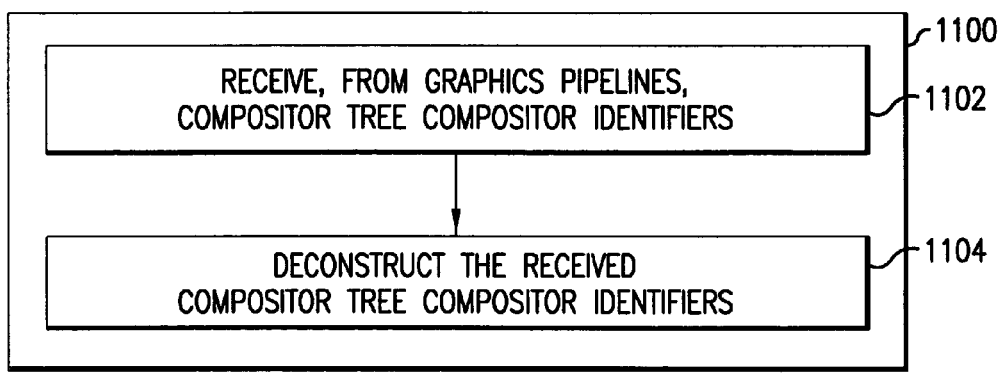
FIG. 11 is a block diagram of a method 1100 of determining a structure of a compositor tree according to the present invention.

FIG. 11 is a block diagram of a method 1100 of determining a structure of a compositor tree according to the present invention. In method 1100, at a step 1102 from graphics pipelines, compositor tree compositor identifiers are received. For example, in compositor tree 100, where a bus node number of a graphics pipeline or a compositor is used as a unique compositor identifier, the received compositor tree compositor identifiers are as shown in Table III:

TABLE III

| Graphics Pipeline | Compositor Tree Compositor Identifier |
|---|---|
| 101 | 000.100.200.300 |
| 102 | 000.100.200.301 |
| 103 | 000.100.200.302 |
| 104 | 000.100.200.303 |
| 105 | 000.100.201.304 |
| 106 | 000.100.201.305 |
| 107 | 000.100.201.306 |
| 108 | 000.100.201.307 |
| 109 | 000.101.202.308 |
| 110 | 000.101.202.309 |
| 111 | 000.101.202.310 |
| 112 | 000.101.202.311 |
| 113 | 000.101.203.317 |
| 114 | 000.101.203.318 |
| 115 | 000.101.203.319 |
| 116 | 000.101.203.320 |
| 117 | 000.102.204.321 |
| 118 | 000.102.204.322 |
| 119 | 000.102.204.323 |
| 120 | 000.102.204.200 |
| 121 | 000.102.205.201 |
| 122 | 000.102.205.202 |
| 123 | 000.102.205.203 |
| 124 | 000.102.205.204 |

At a step 1104, the received compositor tree compositor identifiers are deconstructed. Deconstructing the received compositor tree compositor identifiers can be accomplished through a variety of methods as would be known to the skilled artisan.

Figure 12:
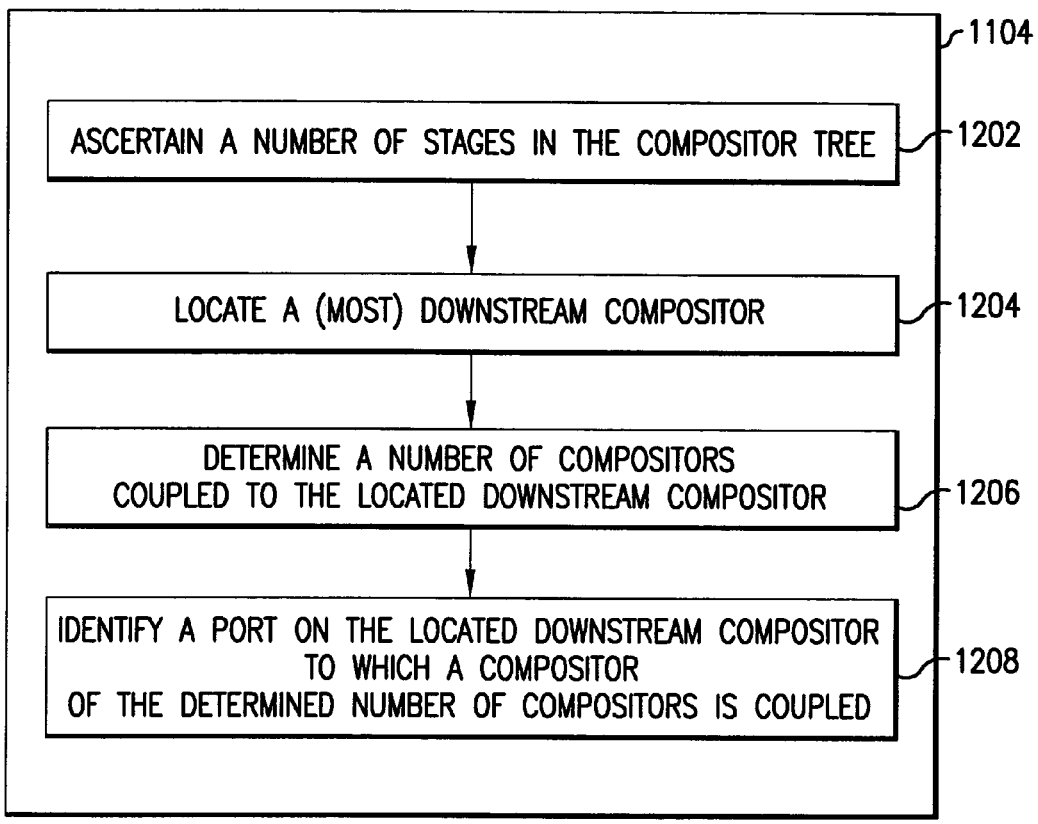
FIG. 12 is a method 1104 to deconstruct the received compositor tree compositor identifiers.

For example, FIG. 12 is a method 1104 to deconstruct the received compositor tree compositor identifiers. In method

1104, at a step 1202, a number of stages in the compositor tree is ascertained. Ascertaining a number of stages in the compositor tree can be accomplished through a variety of methods as would be known to the skilled artisan. For example, a number of unique compositor identifiers within the received compositor tree compositor identifiers can be counted. Alternatively, a number of special characters within the received compositor tree compositor identifiers can be counted. Likewise, a number of unique port identifiers within the received compositor tree compositor identifiers can be counted.

Preferably, at a step 1204, a downstream compositor is located. The downstream compositor can be the most downstream compositor. The most downstream compositor can be located by distinguishing, within the received compositor tree compositor identifiers, a unique compositor identifier common to the received compositor tree compositor identifiers.

Preferably, at a step 1206, a number of compositors coupled to the located downstream compositor is determined. Determining a number of compositors coupled to the located downstream compositor can be accomplished through a variety of methods as would be known to the skilled artisan.

Figure 13:
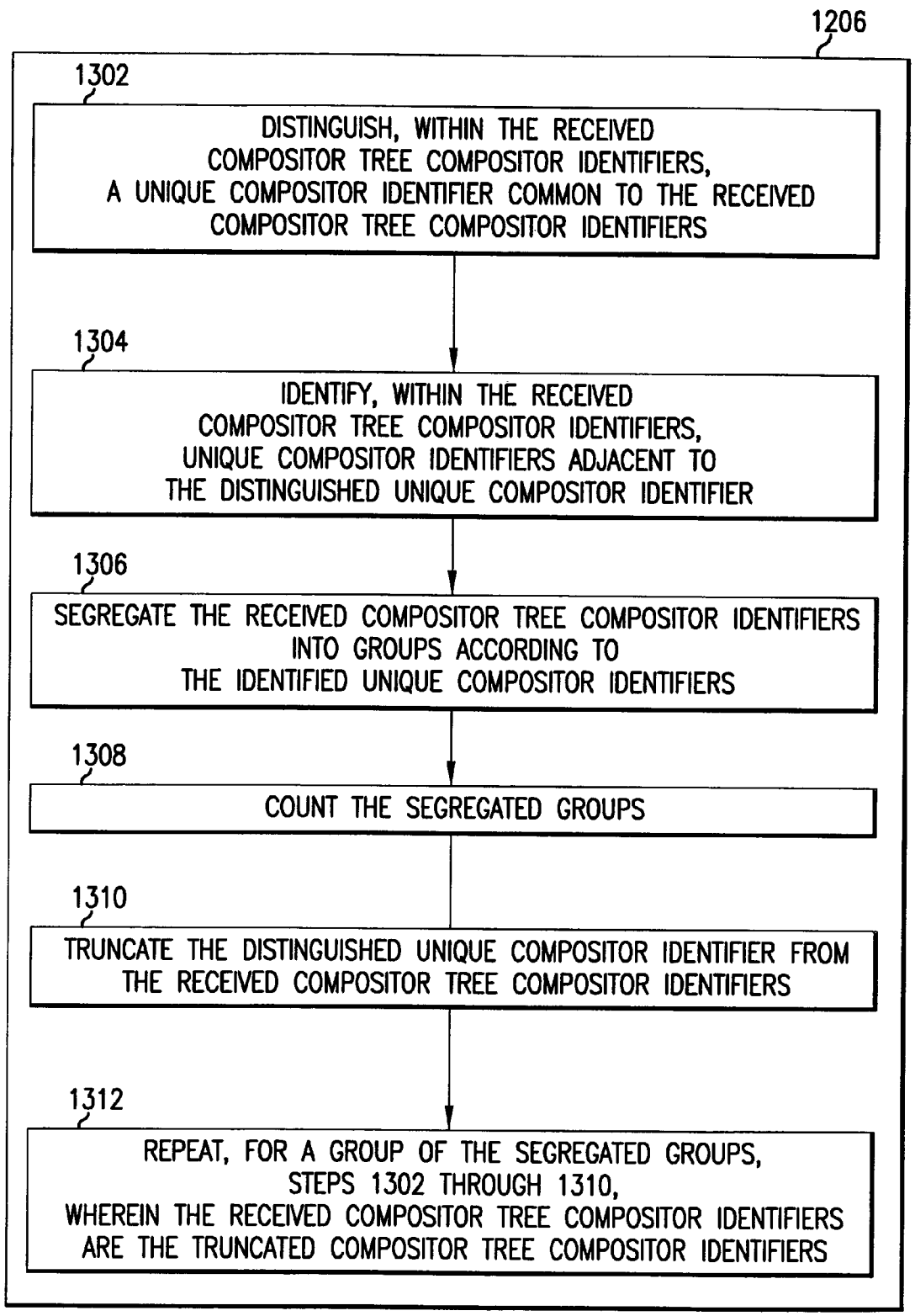
FIG. 13 is a method 1206 to determine a number of compositors coupled to the located downstream compositor.

For example, FIG. 13 is a method 1206 to determine a number of compositors coupled to the located downstream compositor. In method 1206, at a step 1302, within the received compositor tree compositor identifiers, a unique compositor identifier common to the received compositor tree compositor identifiers is distinguished. For example, in compositor tree 100, where a bus node number of a graphics pipeline or a compositor is used as a unique compositor identifier, unique compositor identifier 000 is common to the 24 received compositor tree compositor identifiers.

At a step 1304, within the received compositor tree compositor identifiers, unique compositor identifiers adjacent to the distinguished unique compositor identifier are identified. For example, in compositor tree 100, unique compositor identifiers 100, 101, and 102 are adjacent to the distinguished unique compositor 000.

At a step 1306, the received compositor tree compositor identifiers are segregated into groups according to the identified unique compositor identifiers. For example, the received compositor tree compositor identifiers can be segregated into groups according to unique compositor identifiers 100, 101, and 102.

At a step 1308, the segregated groups are counted. For example, there are three groups.

In the case of a two-stage compositor tree (i.e., graphics pipelines providing inputs to a single compositor), steps 1302 through 1308 are sufficient to determine the structure of the compositor tree. However, where the compositor tree has more than two stages (e.g., compositor tree 100), method 1206 proceeds to a step 1310. At step 1310, the distinguished unique compositor identifier is truncated from the received compositor tree compositor identifiers. For example, unique compositor identifier 000 is truncated from the received compositor tree compositor identifiers.

At a step 1312, for a group of the segregated groups, steps 1302 through 1310 are repeated, wherein the received compositor tree compositor identifiers of step 1302 are replaced by the truncated compositor tree compositor identifiers of step 1310.

Returning to method 1104, preferably, at a step 1208, a port on the located downstream compositor to which a compositor of the determined number of compositors is coupled is identified. The port on the located downstream compositor to which the compositor is coupled can be identified by determining a unique port identifier of the located downstream compositor within a compositor tree compositor identifier of the compositor. For example, if a unique port identifier is attached to a compositor tree compositor identifier, the received compositor tree compositor identifiers are as shown in Table IV:

TABLE IV

| Graphics Pipeline | Compositor Tree Compositor Identifier |
|---|---|
| 101 | 000A.100A.200A.300 |
| 102 | 000A.100A.200B.301 |
| 103 | 000A.100A.200C.302 |
| 104 | 000A.100A.200D.303 |
| 105 | 000A.100B.201A.304 |
| 106 | 000A.100B.201B.305 |
| 107 | 000A.100B.201C.306 |
| 108 | 000A.100B.201D.307 |
| 109 | 000B.101A.202A.308 |
| 110 | 000B.101A.202B.309 |
| 111 | 000B.101A.202C.310 |
| 112 | 000B.101A.202D.311 |
| 113 | 000B.101B.203A.317 |
| 114 | 000B.101B.203B.318 |
| 115 | 000B.101B.203C.319 |
| 116 | 000B.101B.203D.320 |
| 117 | 000C.102A.204A.321 |
| 118 | 000C.102A.204B.322 |
| 119 | 000C.102A.204C.323 |
| 120 | 000C.102A.204D.200 |
| 121 | 000C.102B.205A.201 |
| 122 | 000C.102B.205B.202 |
| 123 | 000C.102B.205C.203 |
| 124 | 000C.102B.205D.204 |

So, in compositor tree 100, graphics pipeline 107 is coupled to port C of compositor 126, which is coupled to port B of compositor 131, which is coupled to port A of compositor 134.

Figure 14:
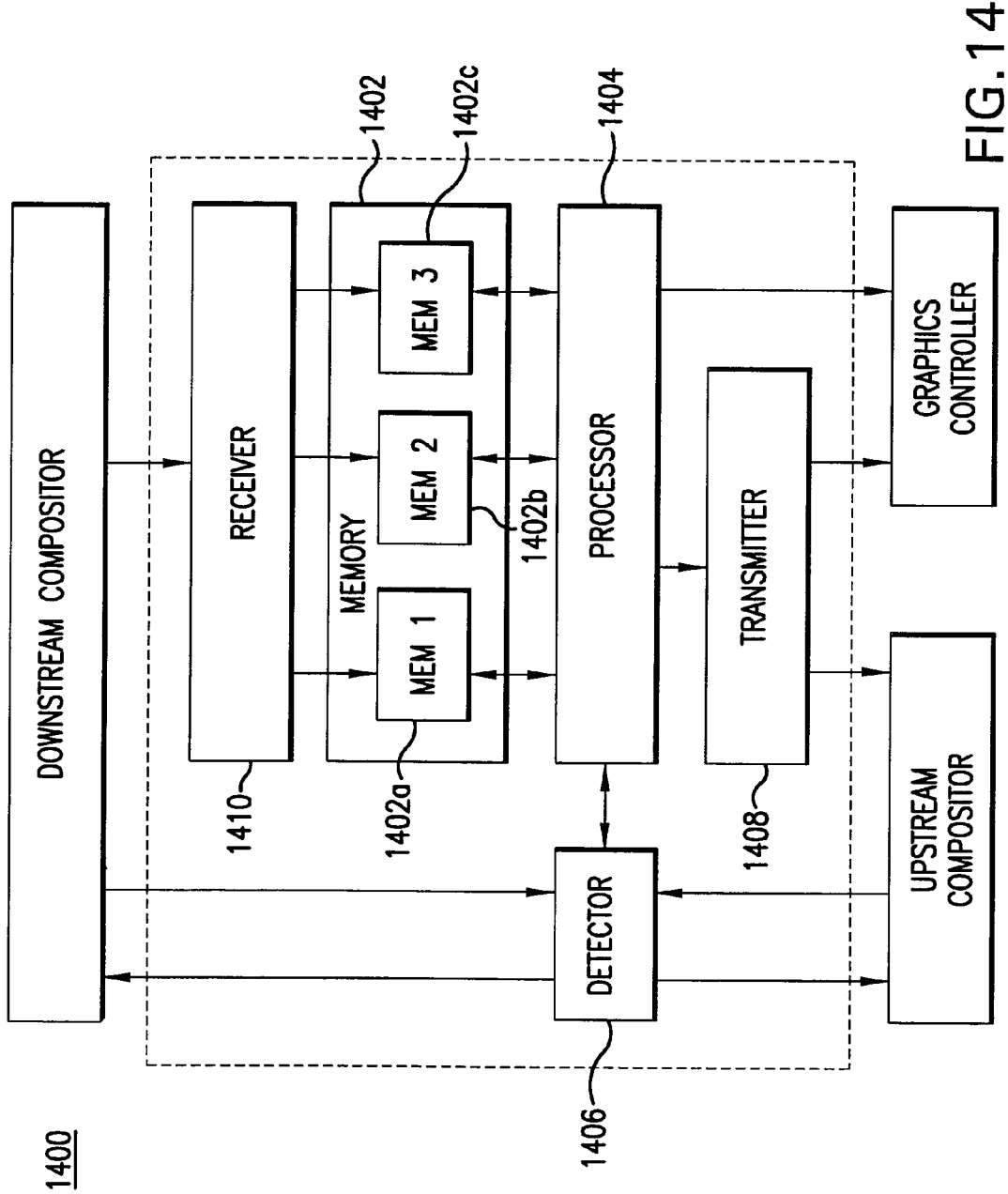
FIG. 14 shows a block diagram of a system 1400 to identify a compositor in and to determine a structure of a compositor tree.

Systems to Identify a Compositor in and to Determine a Structure of a Compositor Tree FIG. 14 shows a block diagram of a system 1400 to identify a compositor in and to determine a structure of a compositor tree. System 1400 comprises a memory 1402, a processor 1404, a detector 1406, a transmitter 1408, and a receiver 1410. Memory 1402 comprises a first memory 1402a, a second memory 14202, a third memory 1402c, and other memories as needed.

When system 1400 is configured to identify a compositor in a compositor tree, first memory 1402a is configured to receive a compositor tree compositor identifier of a downstream compositor. Processor 1404 is coupled to first memory 1402a. Processor 1404 is configured to append the compositor tree compositor identifier of the downstream compositor with a unique compositor identifier of the compositor to produce a compositor tree compositor identifier of the compositor. Second memory 1402b is coupled to processor 1404. Second memory 1402b is configured to store the unique compositor identifier.

In an embodiment, system 1400 further comprises third memory 1402c coupled to processor 1404. Third memory 1402c is configured to store a special character. Processor 1404 is further configured to affix the special character to the compositor tree compositor identifier of the downstream compositor. Processor 1404 then attaches the unique compositor identifier to the special character.

In another embodiment, third memory 1402c is configured to store a unique port identifier of a port of the compositor. Processor 1404 is further configured to attach the unique port identifier to the compositor tree compositor identifier of the compositor.

In yet another embodiment, system 1400 further comprises detector 1406 coupled to processor 1404. Detector 1406 is configured to attempt to detect the downstream compositor.

In still another embodiment, detector 406 is configured to attempt to detect an upstream compositor.

When system 1400 is configured to identify a compositor in a compositor tree, system 1400 can further comprise means, coupled to processor 1404, to communicate the compositor tree compositor identifier of the compositor to a graphics controller. Such means can include Transitional Minimized Differential Signal (TMDS) data links, Inter Integrated Circuit (I²C) busses, or other links and their associated protocols as would be known to one of skill in the art.

In another embodiment, system 1400 can further comprise transmitter 1408 coupled to processor 1404. Transmitter 1408 if configured to transmit the compositor tree compositor identifier of the compositor to a graphics controller via an I²C bus.

In yet another embodiment, transmitter 1408 is configured to transmit the compositor tree compositor identifier of the compositor to an upstream compositor.

When system 1400 is configured to determine a structure of a compositor tree, memory 1402 is configured to store compositor tree compositor identifiers of compositors in the compositor tree. Processor 1404 is coupled to memory 1402. Processor 1404 is configured to locate a downstream compositor of the compositor tree. Processor 1404 then counts a number of compositors coupled to the downstream compositor.

In an embodiment, processor 1404 is further configured to identify a compositor of the compositor tree having a compositor tree compositor identifier of the compositor tree compositor identifiers with only one unique compositor identifier.

In another embodiment, processor 1404 is further configured to identify compositors of the compositor tree having compositor tree compositor identifiers of the compositor tree compositor identifiers with more than one unique compositor identifier. Processor 1404 then selects a compositor of the compositor tree other than the compositors having the compositor tree compositor identifiers with the more than one unique compositor identifier. Preferably, processor 1404 is further configured to distinguish compositors of the compositor tree having compositor tree compositor identifiers of the compositor tree compositor identifiers with a special character.

In yet another embodiment, processor 1404 is further configured to identify compositors of the compositor tree having compositor tree compositor identifiers of the compositor tree compositor identifiers with a unique port identifier. Processor 1404 then selects a compositor of the compositor tree other than the compositors having the compositor tree compositor identifiers with the unique port identifier.

In still another embodiment, processor 1404 is further configured to identify compositors of the compositor tree having compositor tree compositor identifiers of the compositor tree compositor identifiers with a parent compositor tree identifier that is identical to a compositor tree compositor identifier of the downstream compositor. Processor 1404 then tallies a number of the compositors having the compositor tree compositor identifiers with the parent compositor tree identifier.

When system 1400 is configured to determine a structure of a compositor tree, processor 1404 can be further configured to ascertain if a compositor of the number of compositors coupled to the downstream compositor is a graphics pipeline. Preferably, transmitter 1408 is coupled to processor 1404. Transmitter 1408 is configured to transmit a compositor tree compositor identifier of the graphics pipeline to a graphics controller.

In an embodiment, processor 1404 is further configured to determine if a compositor tree compositor identifier of the compositor of the number of compositors coupled to the downstream compositor has an equal or greater number of unique compositor identifiers as compositor tree compositor identifiers of other compositors of the compositor tree.

In another embodiment, processor 1404 is further configured to determine if a compositor tree compositor identifier of the compositor of the number of compositors coupled to the downstream compositor has an equal or greater number of special characters as compositor tree compositor identifiers of other compositors of the compositor tree.

In yet another embodiment, processor 1404 is further configured to determine if a compositor tree compositor identifier of the compositor of the number of compositors coupled to the downstream compositor has an equal or greater number of unique port identifiers as compositor tree compositor identifiers of other compositors of the compositor tree.

When system 1400 is configured to determine a structure of a compositor tree, processor 1404 can be further configured to distinguish a compositor of the number of compositors coupled to the downstream compositor. Processor 1404 then counts, for the compositor of the number of compositors coupled to the downstream compositor, a new number of compositors coupled to the compositor of the number of compositors coupled to the downstream compositor.

In an embodiment, processor 1404 is further configured to identify a compositor tree compositor identifier of the compositor of the number of compositors coupled to the downstream compositor.

In another embodiment, processor 1404 is further configured to identify a port on the downstream compositor to which the compositor of the number of compositors coupled to the downstream compositor is coupled. Preferably, processor 1404 is further configured to find a unique port identifier of the downstream compositor within a compositor tree compositor identifier of the compositor of the number of compositors coupled to the downstream compositor.

In yet another embodiment, detector 1406 is coupled to processor 1404. Detector 1406 is configured to attempt to detect, for the compositor of the number of compositors coupled to the downstream compositor is coupled, an upstream compositor.

Alternatively, when system 1400 is configured to determine a structure of a compositor tree, receiver 1410 is configured to receive, from graphics pipelines, compositor tree compositor identifiers. Memory 1402 is coupled to receiver 1410. Memory 1402 is configured to store compositor tree compositor identifiers of compositors in the compositor tree. Processor 1404 is coupled to memory 1402. Processor 1404 is configured to deconstruct the compositor tree compositor identifiers.

Processor 1404 can be further configured to ascertain a number of stages in the compositor tree.

In an embodiment, processor 1404 is further configured to count a number of unique compositor identifiers within the compositor tree compositor identifiers.

In another embodiment, processor 1404 is further configured to count a number of special characters within the compositor tree compositor identifiers.

In yet another embodiment, processor 1404 is further configured to count a number of unique port identifiers within the compositor tree compositor identifiers.

Processor 1404 can be further configured to locate a downstream compositor of the compositor tree. Preferably, processor 1404 is further configured to distinguish, within the compositor tree compositor identifiers, a unique compositor identifier common to the compositor tree compositor identifiers.

Processor 1404 can be further configured to determine a number of compositors coupled to the downstream compositor.

In an embodiment, processor 1404 is further configured to distinguish, within the compositor tree compositor identifiers, a unique compositor identifier common to the compositor tree compositor identifiers. Processor 1404 next identifies, within the compositor tree compositor identifiers, unique compositor identifiers adjacent to the unique compositor identifier common to the compositor tree compositor identifiers. Processor 1404 then segregates the compositor tree compositor identifiers into groups according to the unique compositor identifiers adjacent to the unique compositor identifier common to the compositor tree compositor identifiers. Finally, processor 1404 counts the groups.

Additionally, processor 1404 can be further configured to truncate the unique compositor identifier common to the compositor tree compositor identifiers from the compositor tree compositor identifiers, thereby producing new compositor tree compositor identifiers. For a group of the groups, processor 1404 then repeats this process by using the new compositor tree compositor identifiers in place of the original compositor tree compositor identifiers.

Processor 1404 can be further configured to identify a port on the downstream compositor to which a compositor of the number of compositors is coupled. Preferably, processor 1404 is further configured to determine a unique port identifier of the downstream compositor within a compositor tree compositor identifier of the compositor of the number of compositors.

Computer Program Products to Identify a Compositor in and to Determine a Structure of a Compositor Tree The present invention can be implemented as computer program products to identify a compositor in and to determine a structure of a compositor tree. The computer program products can have computer program code means embodied in a computer useable medium.

The computer program code means for a computer program product for identifying a compositor in a compositor tree can comprise a first program code means for causing the computer system to receive, at the compositor, a compositor tree compositor identifier from a downstream compositor, and a second program code means for causing the computer system to append the compositor tree compositor identifier with a unique compositor identifier of the compositor to produce a compositor tree compositor identifier of the compositor.

In an embodiment, the first program code means can comprise a third program code means for causing the computer system to affix a special character to the compositor tree compositor identifier from the downstream compositor, and a fourth program code means for causing the computer system to attach the unique compositor identifier to the special character.

In another embodiment, the computer program product for identifying a compositor in a compositor tree can further comprise a fifth program code means for causing the computer system to detect the downstream compositor. Preferably, the fifth program code means comprises a sixth program code means for causing the computer system to cause the compositor to attempt to detect the downstream compositor, and a seventh program code means for causing the computer system to cease attempting to receive the compositor tree compositor identifier from the downstream compositor if the attempt to detect the downstream compositor failed.

In yet another embodiment, the computer program product for identifying a compositor in a compositor tree can further comprise an eighth program code means for causing the computer system to attach a unique port identifier to the compositor tree compositor identifier of the compositor.

In still another embodiment, the computer program product for identifying a compositor in a compositor tree can further comprise a ninth program code means for causing the computer system to read, at a graphics controller, the compositor tree compositor identifier of the compositor.

In another embodiment, the computer program product for identifying a compositor in a compositor tree can further comprise a tenth program code means for causing the computer system to transmit the compositor tree compositor identifier of the compositor to a graphics controller via an Inter Integrated Circuit bus.

In yet another embodiment, the computer program product for identifying a compositor in a compositor tree can further comprise an eleventh program code means for causing the computer system to transmit the compositor tree compositor identifier of the compositor to an upstream compositor. Preferably, the computer program product for identifying a compositor in a compositor tree further comprises a twelfth program code means for causing the computer system to detect the upstream compositor. Preferably, the twelfth program code means comprises a thirteenth program code means for causing the computer system to cause the compositor to attempt to detect the upstream compositor, and a fourteenth program code means for causing the computer system to cease attempting to transmit the compositor tree compositor identifier of the compositor if the attempt to detect the upstream compositor failed.

The computer program code means for a computer program product for determining a structure of a compositor tree can comprise a first program code means for causing the computer system to locate a downstream compositor of the compositor tree, and a second program code means for causing the computer system to count a number of compositors coupled to the downstream compositor.

In an embodiment, the first program code means can comprise a third program code means for causing the computer system to identify a compositor of the compositor tree having a compositor tree compositor identifier with only one unique compositor identifier.

In another embodiment, the first program code means can comprise a fourth program code means for causing said computer system to identify compositors of the compositor tree having compositor tree compositor identifiers with more than one unique compositor identifier, and a fifth program code means for causing the computer system to select a compositor of the compositor tree other than the compositors of the compositor tree having compositor tree compositor identifiers with more than one unique compositor identifier. Preferably, the fourth program code means comprises a sixth program code means for causing the computer system to distinguish compositors of the compositor tree having compositor tree compositor identifiers with a special character.

In yet another embodiment, the first program code means can comprise a seventh program code means for causing the computer system to identify compositors of the compositor tree having compositor tree compositor identifiers with a unique port identifier, and an eighth program code means for causing the computer system to select a compositor of the compositor tree other than the compositors of the compositor tree having compositor tree compositor identifiers with the unique port identifier.

In an embodiment, the second program code means can comprise a ninth program code means for causing the computer system to identify compositors of the compositor tree having compositor tree compositor identifiers with a parent compositor tree compositor identifier that is identical to a compositor tree compositor identifier of the downstream compositor, and a tenth program code means for causing the, computer system to tally a number of the compositors having the compositor tree compositor identifiers with the parent compositor tree compositor identifier that is identical to the compositor tree compositor identifier of the downstream compositor.

The computer program product for determining a structure of a compositor tree can further comprise an eleventh program code means for causing the computer system to ascertain if a compositor of the number of compositors coupled to the downstream compositor is a graphics pipeline, and a twelfth program code means for causing the computer system to transmit a compositor tree compositor identifier of the graphics pipeline to a graphics controller.

In an embodiment, the eleventh program code means can comprise a thirteenth program code means for causing the computer system to determine if a compositor tree compositor identifier of the compositor of the number of compositors coupled to the downstream compositor has an equal or greater number of unique compositor identifiers as compositor tree compositor identifiers of other compositors of the compositor tree.

In another embodiment, the eleventh program code means can comprise a fourteenth program code means for causing the computer system to determine if a compositor tree compositor identifier of the compositor of the number of compositors coupled to the downstream compositor has an equal or greater number of special characters as compositor tree compositor identifiers of other compositors of the compositor tree.

In yet another embodiment, the eleventh program code means can comprise a fifteenth program code means for causing the computer system to determine if a compositor tree compositor identifier of the compositor of the number of compositors coupled to the downstream compositor has an equal or greater number of unique port identifiers as compositor tree compositor identifiers of other compositors of the compositor tree.

The computer program product for determining a structure of a compositor tree can further comprise a sixteenth program code means for causing the computer system to distinguish a compositor of the number of compositors coupled to the downstream compositor, and a seventeenth program code means for causing the computer system to count, for the compositor of the number of compositors coupled to the downstream compositor, a new number of compositors coupled to the compositor of the number of compositors coupled to the downstream compositor.

In an embodiment, the sixteenth program code means can comprise an eighteenth program code means for causing the computer system to identify a compositor tree compositor identifier of the compositor of the number of compositors coupled to the downstream compositor.

In another embodiment, the sixteenth program code means can comprise a nineteenth program code means for causing the computer system to identify a port on the downstream compositor to which the compositor of the number of compositors coupled to the downstream compositor is coupled. Preferably, the sixteenth program code means can comprise a twentieth program code means for causing the computer system to find a unique port identifier of the downstream compositor within a compositor tree compositor identifier of the compositor of the number of compositors coupled to the downstream compositor.

The computer program product for determining a structure of a compositor tree can further comprise a twenty-first program code means for causing the computer system to detect an upstream compositor. Preferably, the twenty-first program code means comprises a twenty-second program code means for causing the computer system to cause the compositor of the number of compositors coupled to the downstream compositor to attempt to detect the upstream compositor, and a twenty-third program code means for causing the computer system to cease attempting to count, for the compositor of the number of compositors coupled to the downstream compositor, the new number of compositors coupled to the compositor of the number of compositors coupled to the downstream compositor if the attempt to detect the upstream compositor failed.

Alternatively, the computer program code means for a computer program product for determining a structure of a compositor tree can comprise a first program code means for causing the computer system to receive, from graphics pipelines, compositor tree compositor identifiers, and a second program code means for causing the computer system to deconstruct the compositor tree compositor identifiers.

In an embodiment, the second program code means can comprise a third program code means for causing the computer system to ascertain a number of stages in the compositor tree.

In an embodiment, the third program code means can comprise a fourth program code means for causing the computer system to count a number of unique compositor identifiers within the compositor tree compositor identifiers.

In another embodiment, the third program code means can comprise a fifth program code means for causing the computer system to count a number of special characters within the compositor tree compositor identifiers.

In yet another embodiment, the third program code means can comprise a sixth program code means for causing the computer system to count a number of unique port identifiers within the compositor tree compositor identifiers.

The computer program product for determining a structure of a compositor tree can further comprise a seventh program code means for causing the computer system to locate a downstream compositor of the compositor tree. Preferably, the seventh program code means comprises an eighth program code means for causing the computer system to distinguish, within the compositor tree compositor identifiers, a unique compositor identifier common to the compositor tree compositor identifiers.

The computer program product for determining a structure of a compositor tree can further comprise a ninth program code means for causing the computer system to determine a number of compositors coupled to the downstream compositor.

In an embodiment, ninth program code means can comprise a tenth program code means for causing the computer system to distinguish, within the compositor tree compositor identifiers, a unique compositor identifier common to the compositor tree compositor identifiers; an eleventh program code means for causing the computer system to identify, within the compositor tree compositor identifiers, unique compositor identifiers adjacent to the unique compositor identifier common to the compositor tree compositor identifiers; a twelfth program code means for causing the computer system to segregate the compositor tree compositor identifiers into groups according to the unique compositor identifiers adjacent to the unique compositor identifier common to the compositor tree compositor identifiers; and a thirteenth program code means for causing the computer system to count the groups.

Additionally, ninth program code means can further comprise a fourteenth program code means for causing the computer system to truncate the unique compositor identifier common to the compositor tree compositor identifiers from the compositor tree compositor identifiers, thereby producing new compositor tree compositor identifiers; and a fifteenth program code means for causing the computer system to repeat, for a group of the groups, the tenth program means through the fourteenth program means by using the new compositor tree compositor identifiers in place of the original compositor tree compositor identifiers.

The computer program product for determining a structure of a compositor tree can further comprise a sixteenth program code means for causing the computer system to identify a port on the downstream compositor to which a compositor of the number of compositors is coupled. Preferably, the sixteenth program code means comprises a seventeenth program code means for causing the computer system to determine a unique port identifier of the downstream compositor within a compositor tree compositor identifier of the compositor of the number of compositors.

Figure 15:
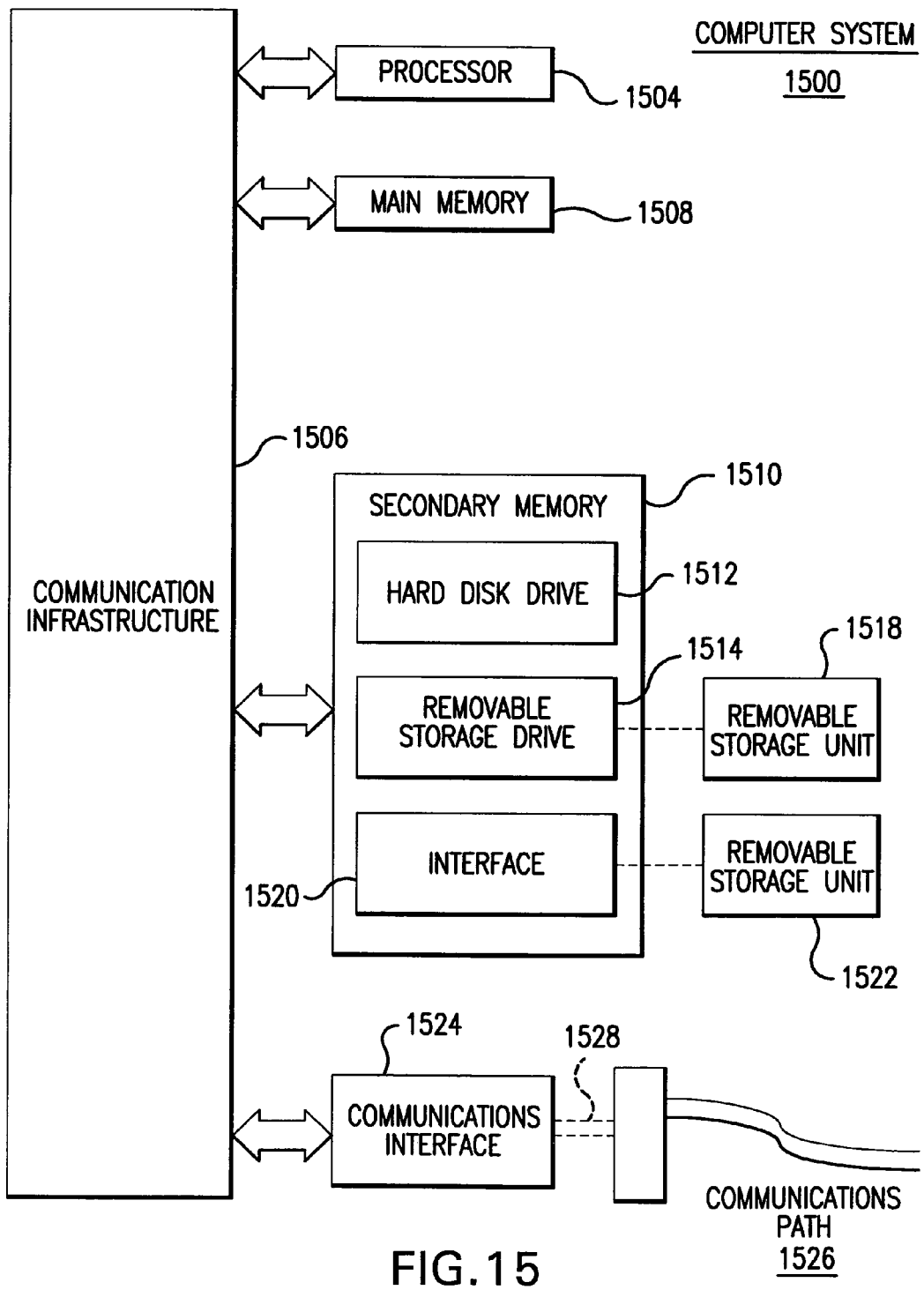
FIG. 15 illustrates an example computer system 1500, in which the present invention can be implemented as programable code.

The program code means, or software, of the present invention executes on a computer system. FIG. 15 illustrates an example computer system 1500, in which the present invention can be implemented as programable code. Various embodiments of the invention are described in terms of this example computer system 1500. After reading this description, it will become apparent to a person skilled in the art how to implement the invention using other computer systems and/or computer architectures.

The computer system 1500 includes one or more processors, such as processor 1504. Processor 1504 can be a special purpose or a general purpose digital signal processor. The processor 1504 is connected to a communication infrastructure 1506 (for example, a bus or network). Various software implementations are described in terms of this exemplary computer system. After reading this description, it will become apparent to a person skilled in the art how to implement the invention using other computer systems and/or computer architectures.

Computer system 1500 also includes a main memory 1508, preferably random access memory (RAM), and may also include a secondary memory 1510. The secondary memory 1510 may include, for example, a hard disk drive 1512 and/or a removable storage drive 1514, representing a floppy disk drive, a magnetic tape drive, an optical disk drive, etc. The removable storage drive 1514 reads from and/or writes to a removable storage unit 1518 in a well known manner. Removable storage unit 1518, represents a floppy disk, magnetic tape, optical disk, etc. which is read by and written to by removable storage drive 1514. As will be appreciated, the removable storage unit 1518 includes a computer usable storage medium having stored therein computer software and/or data.

In alternative implementations, secondary memory 1510 may include other similar means for allowing computer programs or other instructions to be loaded into computer system 1500. Such means may include, for example, a removable storage unit 1522 and an interface 1520. Examples of such means may include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to computer system 1500.

Computer system 1500 may also include a communications interface 1524. Communications interface 1524 allows software and data to be transferred between computer system 1500 and external devices. Examples of communications interface 1524 may include a modem, a network interface (such as an Ethernet card), a communications port, a Personal Computer Memory Card International Association (PCMCIA) slot and card, etc. Software and data transferred via communications interface 1524 are in the form of signals 1528 which may be electronic, electromagnetic, optical, or other signals capable of being received by communications interface 1524. These signals 1528 are provided, to communications interface 1524 via a communications path 1526. Communications path 1526 carries signals 1528 and may be implemented using wire or cable, fiber optics, a phone line, a cellular phone link, a radio frequency link, and other communications channels.

In this document, the terms "computer program medium" and "computer usable medium" are used generally to refer to media such as removable storage drive 1514, a hard disk installed in hard disk drive 1512, and signals 1528. These computer program products are means for providing software to computer system 1500.

Computer programs (also called computer control logic) are stored in main memory 1508 and/or secondary memory 1510. Computer programs may also be received via communications interface 1524. Such computer programs, when executed, enable the computer system 1500 to implement the present invention as discussed herein. Accordingly, such computer programs represent controllers of the computer system 1500. Where the invention is implemented using software, the software may be stored in a computer program product and loaded into computer system 1500 using removable storage drive 1514, hard drive 1512, or communications interface 1524.

CONCLUSION

The embodiments of the present invention as described herein with respect to FIGS. 1–15 can be implemented in software, firmware, hardware or a combination thereof. While various embodiments of the present invention have been described above, it should be understood that they have been presented by way of example, and not limitation. It will be apparent to persons skilled in the relevant art that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method of determining a structure of a compositor tree, comprising:
   (1) locating a downstream compositor of the compositor tree;
   (2) counting a number of compositors coupled to said located downstream compositor; and
   (3) ascertaining if a compositor of said counted number of compositors is a graphics pipeline.

2. The method of claim 1, further comprising:
   (4) transmitting a compositor tree compositor identifier of said ascertained graphics pipeline to a graphics controller.

3. The method of claim 2, further comprising:
   (5) distinguishing a compositor of said counted number of compositors; and
   (6) counting, for said distinguished compositor, a new number of compositors coupled to said distinguished compositor.

4. The method of claim 3, further comprising:
   (7) detecting, for said distinguished compositor, an upstream compositor.

5. A method of determining a structure of a compositor tree, comprising:
   (1) receiving, from graphics pipelines, at least one compositor tree compositor identifier that includes a unique compositor identifier and a unique port identifier; and
   (2) deconstructing said received at least one compositor tree compositor identifier.

6. The method of claim 5, wherein said deconstructing step comprises:
   ascertaining a number of stages in the compositor tree.

7. The method of claim 6, further comprising:
   locating a downstream compositor.

8. The method of claim 7, further comprising:
   determining a number of compositors coupled to said located downstream compositor.

9. A system to determine a structure of a compositor tree, comprising:
   a memory configured to store compositor tree compositor identifiers of compositors in the compositor tree; and
   a processor coupled to said memory, and configured to locate a downstream compositor of the compositor tree, to count a number of compositors coupled to said downstream compositor, and to ascertain if a compositor of said number of compositors coupled to said downstream compositor is a graphics pipeline.

10. The system of claim 9, further comprising:
    a transmitter coupled to said processor, and configured to transmit a compositor tree compositor identifier of said graphics pipeline to a graphics controller.

11. The system of claim 9, wherein said processor is further configured to distinguish a compositor of said number of compositors coupled to said downstream compositor, and to count, for said compositor of said number of compositors coupled to said downstream compositor, a new number of compositors coupled to said compositor of said number of compositors coupled to said downstream compositor.

12. The system of claim 11, further comprising:
    a detector coupled to said processor, and configured to attempt to detect, for said compositor of said number of compositors coupled to said downstream compositor, an upstream compositor.

13. A system to determine a structure of a compositor tree, comprising:
    a receiver configured to receive, from graphics pipelines, compositor tree compositor identifiers, wherein a compositor tree compositor identifier of said compositor tree compositor identifiers includes a unique compositor identifier and a unique port identifier;
    a memory coupled to said receiver, and configured to store compositor tree compositor identifiers of compositors in the compositor tree; and
    a processor coupled to said memory, and configured to deconstruct said compositor tree compositor identifiers.

14. The system of claim 13, wherein said processor is further configured to ascertain a number of stages in the compositor tree.

15. The system of claim 14, wherein said processor is further configured to locate a downstream compositor of the compositor tree.

16. The system of claim 15, wherein said processor is further configured to determine a number of compositors coupled to said downstream compositor.

17. The system of claim 16, wherein said processor is further configured to identify a port on said downstream compositor to which a compositor of said number of compositors is coupled.

* * * * *